(12) United States Patent
Khawer et al.

(10) Patent No.: US 11,523,315 B2
(45) Date of Patent: Dec. 6, 2022

(54) SHARED SPECTRUM WITH HIGH AVAILABILITY FOR PRIVATE ENTERPRISE NETWORKS

(71) Applicant: Nokia Solutions and Networks Oy, Espoo (FI)

(72) Inventors: Mohammad Riaz Khawer, Murray Hill, NJ (US); Milind M. Buddhikot, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 22 days.

(21) Appl. No.: 17/058,543

(22) PCT Filed: May 25, 2018

(86) PCT No.: PCT/US2018/034647
§ 371 (c)(1),
(2) Date: Nov. 24, 2020

(87) PCT Pub. No.: WO2019/226173
PCT Pub. Date: Nov. 28, 2019

(65) Prior Publication Data
US 2021/0195484 A1 Jun. 24, 2021

(51) Int. Cl.
*H04W 36/06* (2009.01)
*H04W 16/14* (2009.01)
(Continued)

(52) U.S. Cl.
CPC ........... *H04W 36/06* (2013.01); *H04W 16/14* (2013.01); *H04W 36/20* (2013.01); *H04W 36/32* (2013.01)

(58) Field of Classification Search
CPC ..... H04W 36/06; H04W 16/14; H04W 36/20; H04W 36/32
See application file for complete search history.

(56) References Cited

U.S. PATENT DOCUMENTS

2015/0319621 A1 11/2015 Markwart et al.
2017/0170888 A1 6/2017 Yrjola et al.
(Continued)

OTHER PUBLICATIONS

International Preliminary Report on Patentability dated Dec. 10, 2020 for International Application No. PCT/US2018/034647, 9 pages.

*Primary Examiner* — Ankur Jain
(74) *Attorney, Agent, or Firm* — Tong, Rea, Bentley & Kim, LLC

(57) ABSTRACT

A base station establishes a wireless connection in a first portion of a frequency band with a user equipment located in a first geographic area. The first portion is allocated to an operator of the base station in response to a request transmitted to a spectrum access server (SAS). The user equipment is handed over from the first portion to a second portion of the frequency band in response to detecting presence of an incumbent that is allocated a third portion of the frequency band for exclusive use within a second geographic area that overlaps with the first geographic area. The third portion overlaps with the first portion. The second portion is allocated to the operator in response to the request. The first portion and the second portion are separated by a frequency bandwidth that is larger than a threshold determined based on a frequency bandwidth allocated to incumbents.

20 Claims, 11 Drawing Sheets

(51) Int. Cl.
*H04W 36/20* (2009.01)
*H04W 36/32* (2009.01)

(56) References Cited

U.S. PATENT DOCUMENTS

2017/0208454 A1\* 7/2017 Knisely ................ H04L 5/0058
2018/0092093 A1\* 3/2018 Ramaswamy ........... H04B 1/58

\* cited by examiner

| BASE STATION 905 | PAL | GAA |
|---|---|---|
| CHANNEL 1 | 3550-3570 | |
| CHANNEL 2 | | 3640-3660 |

| BASE STATION 906 | PAL | GAA |
|---|---|---|
| CHANNEL 1 | 3600-3620 | |
| CHANNEL 2 | | 3680-3700 |

FIG. 10

US 11,523,315 B2

SHARED SPECTRUM WITH HIGH AVAILABILITY FOR PRIVATE ENTERPRISE NETWORKS

CROSS-REFERENCE TO RELATED APPLICATIONS

The present application is a 371 application of PCT Patent Application Serial No. PCT/US18/34647, entitled "SHARED SPECTRUM WITH HIGH AVAILABILITY FOR PRIVATE ENTERPRISE NETWORKS", and filed on May 25, 2018, the entirety of which is incorporated by reference herein.

BACKGROUND

Description of the Related Art

Spectrum is the most precious commodity in deploying wireless networks such as a private enterprise network. Cellular communication systems, such as networks that provide wireless connectivity using Long Term Evolution (LTE) standards, provide more reliable service and superior quality-of-service (QoS) than comparable services provided by conventional contention-based services in unlicensed frequency bands, such as Wi-Fi. The most valuable spectrum available for cellular communication is at frequencies below 6 Gigahertz (GHz) because transmissions at these frequencies do not require a clear line of sight between the transmitter and the receiver. Much of the sub-6-GHz spectrum is already auctioned off as statically licensed spectrum to various mobile network operators (MNOs) that implement cellular communication system such as LTE networks. The 3.1-4.2 GHz spectrum is occupied by incumbents such as Fixed Satellite System (FSS) and federal incumbents such as U.S. government or military entities. For example, the 3550-3700 MHz frequency band (CBRS band) was previously reserved for exclusive use by incumbents including the United States Navy and Fixed Satellite Service (FSS) earth stations. This band of the spectrum is often highly underutilized. Consequently, organizations and vertical industries such as package distribution companies, energy producers, ports, mines, hospitals, and universities do not have access to sub-6-GHz spectrum and are therefore unable to establish private enterprise networks to provide cellular service such as LTE.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 10 illustrates channel allocations and corresponding licenses assigned to collocated base stations shown in FIG. 9 according to some embodiments.

DETAILED DESCRIPTION

Figure 1:
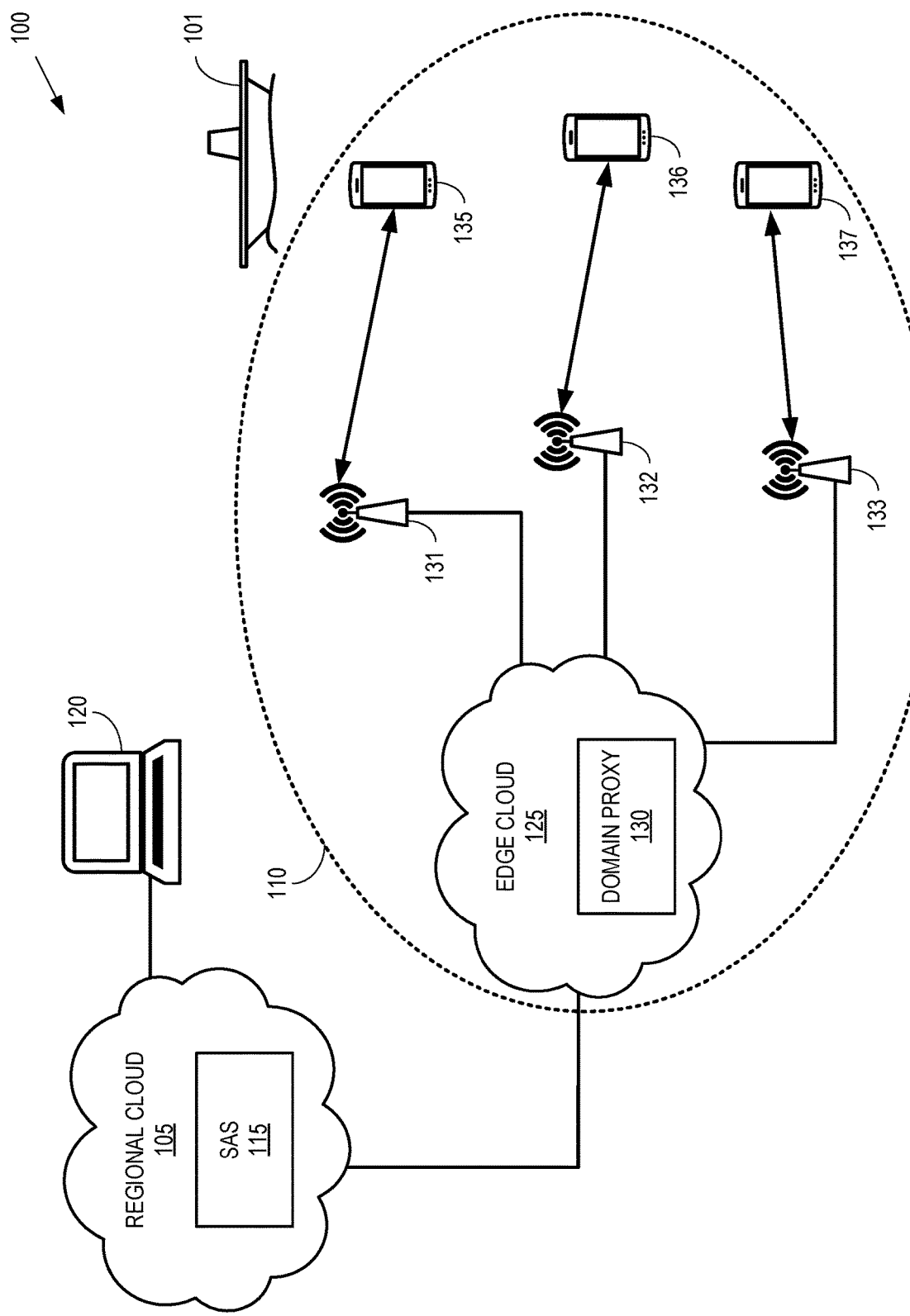
FIG. 1 is a block diagram of a communication system according to some embodiments.

The Federal Communication Commission (FCC) has begun offering bands of spectrum owned by federal entities for sharing with commercial operations. For example, newly issued FCC rules in 47 Code of Federal Regulations (CFR) Part 96 allows sharing of the 3550-3700 MHz Citizens Broadband Radio Service (CBRS) between incumbents and other operators. The CBRS operates according to a tiered access architecture that distinguishes between incumbents, operators that have received a priority access license (PAL) consistent with 47 CFR § 96.23, et seq., and general authorized access (GAA) operators that are authorized to implement one or more Citizens Band Service Devices (CBSDs) consistent with 47 CFR § 96.33, et seq. Incumbents, PAL licensees, and GAA operators are required to request access from a spectrum access server (SAS), which allocates frequency bands to the operators, e.g., for CBRS within the 3550-3700 MHz band. The frequency bands are allocated to the CBSDs associated with the operators within particular geographical areas and, in some cases, during particular time intervals. The SAS determines whether incumbents are present within corresponding geographical areas using an environmental sensing capability (ESC) that performs incumbent detection, e.g., using radar to detect the presence of a Navy ship in a port. Each SAS is able to serve multiple private enterprise networks that include a large number of CBSDs such as base stations, eNodeBs, microcells, picocells, and the like.

The tiered access architecture provides priority access to incumbents, which include Grandfathered Wireless Broadband Licensees that are authorized to operate on a primary basis on frequencies designated in 47 CFR § 96.11. When an incumbent is present in a particular geographical area, the incumbent is granted exclusive access to a portion of the CBRS spectrum. For example, if a Navy ship enters a port, communication systems on the ship are granted exclusive access to a 20-40 MHz band within the 3550-3700 MHz band. Operators that have received a PAL and GAA operators are required to vacate the band allocated to the ship. A PAL license grants exclusive access to a portion of the 3550-3700 MHz band within a predetermined geographical area as long as no incumbents have been allocated an overlapping portion of the 3550-3700 MHz band within the predetermined geographical area. The GAA operators are given access to a portion of the 3550-3700 MHz band within a geographic area as long as no incumbents or PAL licensees have been allocated an overlapping portion in the same geographic area during a concurrent time interval. The GAA operators are also required to share the allocated portion of the 3550-3700 MHz band if other GAA operators are allocated the same portion.

The SAS activates a dynamic protection area (DPA) in response to detecting the presence of an incumbent. The DPA identifies a geographical area and the portion of the frequency band that is allocated for the exclusive use of the incumbent. A CBSD that operates within the DPA on portions of the frequency band that overlap with the exclusively allocated portion of the frequency band is then required to: (1) reduce transmission power so that their coverage area does not overlap with the DPA or (2) move to a new portion of the frequency band that does not overlap with the exclusively allocated portion. In the first option, some user equipment lose access to the CBSD when the power level reduces the coverage area of the CBSD. In the second option, the CBSD is required to interrupt transmission in the original portion of the frequency band, tune its radiofrequency chain to become operational in a new portion of the frequency band, and then reestablish communication with user equipment in the new portion. Lab and field testing indicates that the re-tuning process requires approximately 5-6 minutes to complete. Thus, both options result in unacceptable interruptions in the service provided by private enterprise networks operating in regions that overlap with the DPA.

FIGS. 1-11 disclose embodiments of a spectrum access server (SAS) that allocates a first portion and a second portion of a frequency band to an operator of one or more Citizens Band Service Devices (CBSDs) to support cellular communication with one or more user equipment. The CBSDs are referred to herein as base stations. The first portion and the second portion are separated by a frequency bandwidth that is larger than a threshold determined based on a frequency bandwidth allocated to incumbents. Communication with the one or more user equipment within a coverage area is established using the first portion of the frequency band. Subsequent to establishing communication with the one or more user equipment using the first portion, the SAS activates a dynamic protection area (DPA) in response to detecting an incumbent. The DPA identifies a geographical area and a third portion of the frequency band that is allocated for the exclusive use of the incumbent. User equipment are handed over from the first portion to the second portion of the frequency band in response to the geographical area of the DPA overlapping with the coverage area of the base station and the first portion overlapping the second portion. Transmission by the base station in the first portion of the frequency band is then interrupted. In some embodiments, a dual-carrier base station provides wireless connectivity using the first portion and the second portion of the frequency band. In some embodiments, collocated base stations provide wireless connectivity in the first portion and the second portion of the frequency band. For example, a first base station can provide wireless connectivity in the first portion and a second, collocated can provide wireless connectivity in the second portion of the frequency band, thereby providing hardware redundancy.

In some embodiments, the operator has one or more priority access licenses (PALs) for portions of the frequency band. For example, the operator can have a PAL for the first portion of the frequency band and operate the second portion of the frequency band as a general authorized access (GAA) operator. In that case, wireless connectivity is preferentially provided to user equipment using the first portion and the user equipment are handed over to the second portion in response to detection of the incumbent. Different portions of the frequency band are distributed among collocated base stations if multiple PALs are available for the different portions. For example, a first portion governed by a first PAL is allocated to a first base station and a second portion governed by a second PAL is allocated to a second, collocated base station. The first and second base stations can also support wireless connectivity in third and fourth portions, respectively, of the frequency band, either using a PAL or as a GAA operator. In some embodiments, the third and fourth portions are separated from the first and second portions, respectively, by a frequency bandwidth that is larger than the threshold bandwidth.

FIG. 1 is a block diagram of a communication system 100 according to some embodiments. The communication system 100 operates in accordance with the FCC rules set forth in 47 Code of Federal Regulations (CFR) Part 96, which allows sharing of the 3550-3700 MHz Citizens Broadband Radio Service (CBRS) between incumbents and other operators. However, some embodiments of the communication system 100 operate in accordance with other rules, standards, or protocols that support sharing of a frequency band between incumbents and other devices such that the frequency band is available for exclusive allocation to an incumbent device if the incumbent device is present in a geographic area. In that case, the other devices are required to vacate any portion of the frequency band that overlaps with another portion of the frequency band that is allocated to the incumbent device. For example, if the communication system 100 is deployed (at least in part) proximate a port and a Navy ship such as an aircraft carrier 101 arrives in the port, devices in a geographic area proximate the port that are providing wireless connectivity in a portion of the frequency band allocated to the aircraft carrier 101 are required to vacate the portion of the frequency band to provide the aircraft carrier 101 with exclusive access to the frequency band within the geographic area.

The communication system 100 includes a regional cloud 105 that provides cloud-based support for a private enterprise network 110. Some embodiments of the regional cloud 105 include one or more servers that are configured to provide operations and maintenance (O&M) management, a customer portal, network analytics, software management, and central security for the private enterprise network 110. The regional cloud 105 also includes an SAS 115 to allocate frequency bands to operators, e.g., to the private enterprise network 110 for CBRS within the 3550-3700 MHz band. Operation of the SAS 115 is disclosed in more detail below. A single SAS 115 is shown in FIG. 1 in the interest of clarity. If multiple SAS are present in the communication system 100, the SAS are able to communicate with each other over corresponding SAS-SAS interfaces. The SAS 115 is able to serve multiple private enterprise networks, although a single private enterprise network 110 is shown in FIG. 1 in the interest of clarity.

The regional cloud 105 is configured via user interface portals to one or more external computers 120, only one shown in FIG. 1 in the interest of clarity. For example, the external computer 120 can provide a customer user interface portal for service management, a digital automation cloud management user interface portal, and an SAS user interface portal that is used to configure the SAS 115.

The private enterprise network 110 includes an edge cloud 125 that communicates with the regional cloud 105 to support a plug-and-play deployment of the private enterprise network 110. Some embodiments of the edge cloud 125 support auto configuration and self-service, industrial protocols, local connectivity with low latency, LTE-based communication and local security, high availability, and other optional applications for the private enterprise network 110. In the illustrated embodiment, the edge cloud 125 implements a domain proxy 130 that provides managed access and policy control to a set of CBSDs 131, 132, 133 that are implemented using base stations, base station routers, mini-macrocells, microcells, indoor/outdoor picocells, femtocells, and the like. As used herein, the term "base station" refers to any device that provides wireless connectivity and operates as a CBSD in the private enterprise network 110 as either category A CBSD (Indoor), or Category B CBSD (outdoor). The CBSDs 131, 132, 133 are therefore referred to herein as the base stations 131, 132, 133 and collectively as "the base stations 131-133." Some embodiments of the domain proxy 130 are implemented in the regional cloud 105.

The domain proxy 130 mediates between the SAS 115 and the base stations 131-133. In order to utilize the shared spectrum, the base stations 131-133 transmit requests towards the SAS 115 to request allocation of a portion of a frequency band. The requests include information identifying the portion of the frequency band, a geographic area corresponding to a coverage area of the requesting base station, and, in some cases, a time interval that indicates when the requested portion of the frequency band is to be used for communication. In the illustrated embodiment, the coverage area of the base stations 131-133 corresponds to the area encompassed by the private enterprise network 110. Some embodiments of the domain proxy 130 reduce the signal load between the domain proxy 130 and the SAS 115 by aggregating requests from multiple base stations 131-133 into a smaller number of messages that are transmitted from the domain proxy 130 to the SAS 115. The base stations 131-133 provide wireless connectivity to corresponding user equipment 135, 136, 137 (collectively referred to herein as "the user equipment 135-137") in response to the SAS 115 allocating portions of the frequency band to the base stations 131-133.

The requests transmitted by the base stations 131-133 do not necessarily include the same information. Some embodiments of the requests from the base stations 131-133 include information indicating different portions of the frequency band, different geographic areas, or different time intervals. For example, the base stations 131-133 request portions of the frequency band for use in different time intervals if the private enterprise network 110 is deployed in a mall or shopping center and the base stations 131-133 are used to provide wireless connectivity within different stores that have different operating hours. The domain proxy 130 therefore manages the base stations 131-133 using separate (and potentially different) policies on a per-CBSD basis. In some embodiments, the domain proxy 130 accesses the policies for the base stations 131-133 in response to receiving a request from the corresponding base station 131-133. The domain proxy 130 determines whether the base station 131-133 is permitted to access the SAS 115 based on the policy, e.g., by comparing information in the policy to information in one or more mandatory fields of the request. The domain proxy 130 selectively provides the requests to the SAS 115 depending on whether the base station 131-133 is permitted to access the SAS 115. If so, the request is transmitted to the SAS 115 or aggregated with other requests for transmission to the SAS 115. Otherwise, the request is rejected.

Figure 2:
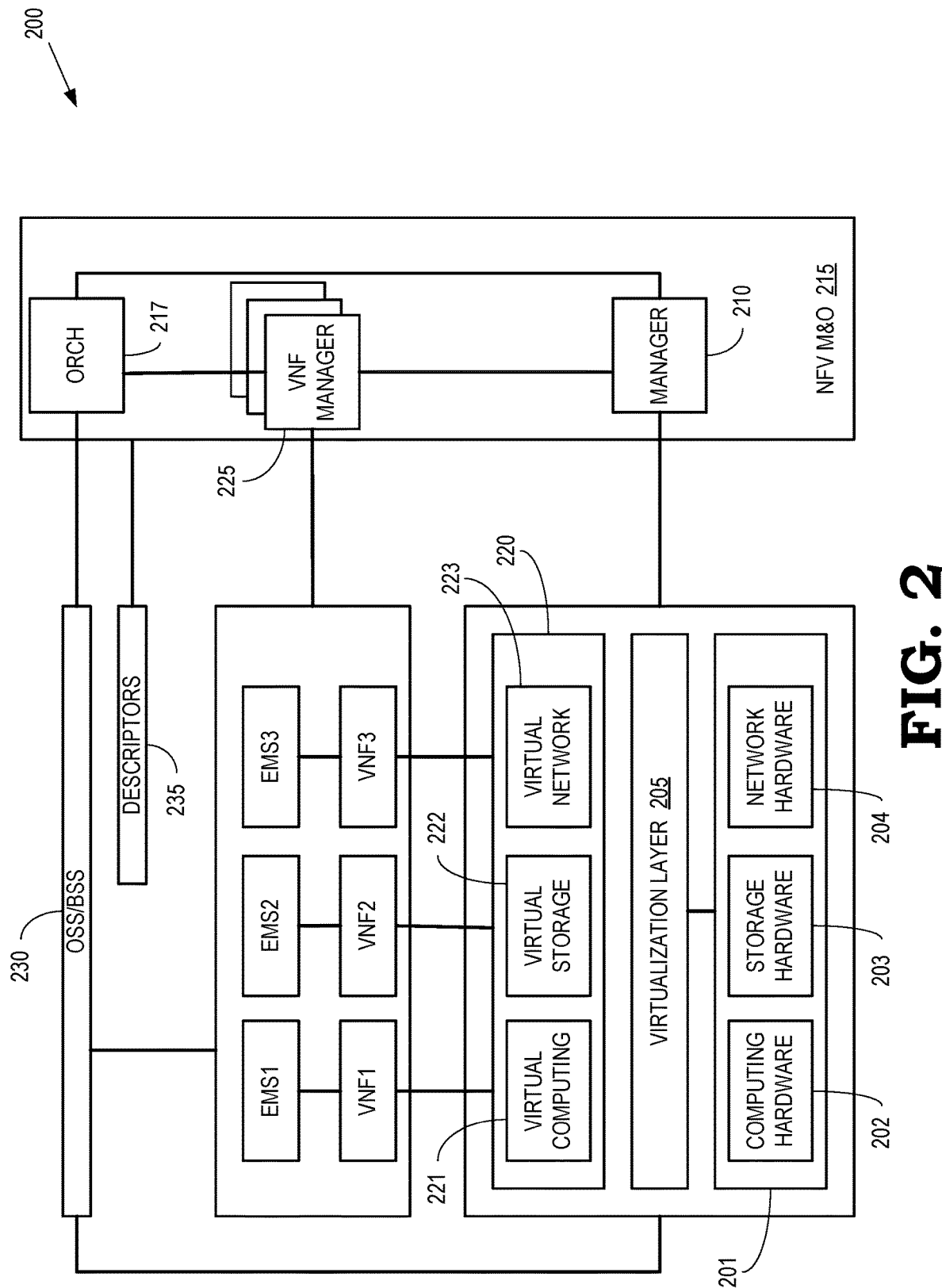
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. For example, the descriptors 235 can be used to store descriptions of a virtual network function implementation of the agent 175 shown in FIG. 1. Information in the descriptors 235 may be updated or modified by the NFV M&O 215.

The NFV architecture 200 can be used to implement network slices that provide user plane or control plane functions. A network slice is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
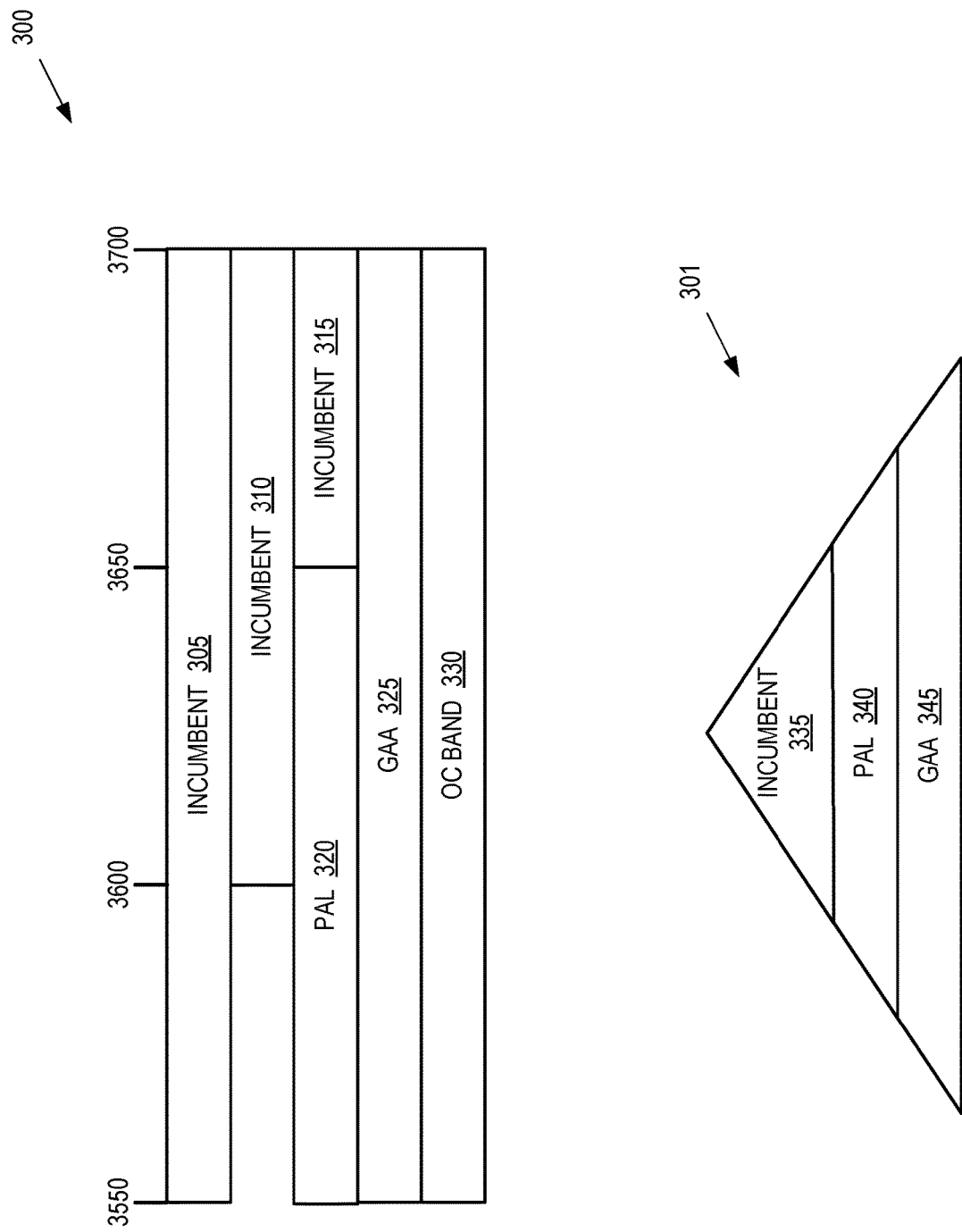
FIG. 3 is a block diagram illustrating an allocation of frequency bands and an access priority for incumbents, licensed users, and general access users according to some embodiments.

FIG. 3 is a block diagram illustrating an allocation 300 of frequency bands and an access priority 301 for incumbents, licensed users, and general access users according to some embodiments. The allocation 300 and the access priorities 301 are used to determine whether CBSDs such as the base stations 131-133 shown in FIG. 1 are given permission to establish a wireless communication links in portions of the frequency band. The frequency band extends from 3550 MHz to 3700 MHz and therefore corresponds to the spectrum allocated for CBRS. An SAS such as the SAS 115 shown in FIG. 1 allocates portions of the frequency band to devices for providing wireless connectivity within a geographic area. For example, the SAS can allocate 20-40 MHz portions of the frequency band to different devices.

Portions of the frequency band are allocated to incumbent federal radio location devices, such as Navy ships, from the block 305, which corresponds to all of the frequencies in the available frequency band. Portions of the frequency band are allocated to incumbent FSS receive-only earth stations from the block 310. Portions of the frequency band are allocated to grandfathered incumbent wireless broadband services from the block 315. As discussed herein, the portions of the frequency band are allocated from the blocks 305, 310, 315 for exclusive use by the incumbent.

Operators that have received a priority access license (PAL) consistent with 47 CFR § 96.23, et seq. are able to request allocation of portions of the frequency band in the block 320. The portion of the frequency band that is allocated to an operator holding a PAL is available for exclusive use by the operator in the absence of any incumbents in an overlapping frequency band and geographic area. For example, the SAS can allocate a PAL channel in any portion of the entire 150 MHz of CBRS band as long as it is not preempted by the presence of an incumbent. Portions of the frequency band within the block 325 are available for allocation to general authorized access (GAA) operators that are authorized to implement one or more CBSDs consistent with 47 CFR § 96.33, et seq. The GAA operators provide wireless connectivity in the allocated portion in the absence of any incumbents or PAL licensees on an overlapping frequency band and geographic area. The GAA operators are also required to share the allocated portion with other GAA operators, if present. Portions of the frequency band within the block 330 are available to other users according to protocols defined by the Third Generation Partnership Project (3GPP).

The access priority 301 indicates that incumbents have the highest priority level 335. Incumbents are therefore always granted exclusive access to a request to portion of the frequency band within a corresponding geographic area. Lower priority operators are required to vacate the portion of the frequency band allocated to the incumbents within the geographic area. The access priority 301 indicates that PAL licensees have the next highest priority level 340, which indicates that PAL licensees receive exclusive access to an allocated portion of the frequency band in the absence of any incumbents. The PAL licensees are also entitled to protection from other PAL licensees within defined temporal, geographic, and frequency limits of their PAL. The GAA operators (and, in some cases, operators using other 3GPP protocols) received the lowest priority level 345. The GAA operators are therefore required to vacate portions of the frequency band that overlap with portions of the frequency band allocated to either incumbents or PAL licensees within an overlapping geographic area.

Figure 4:
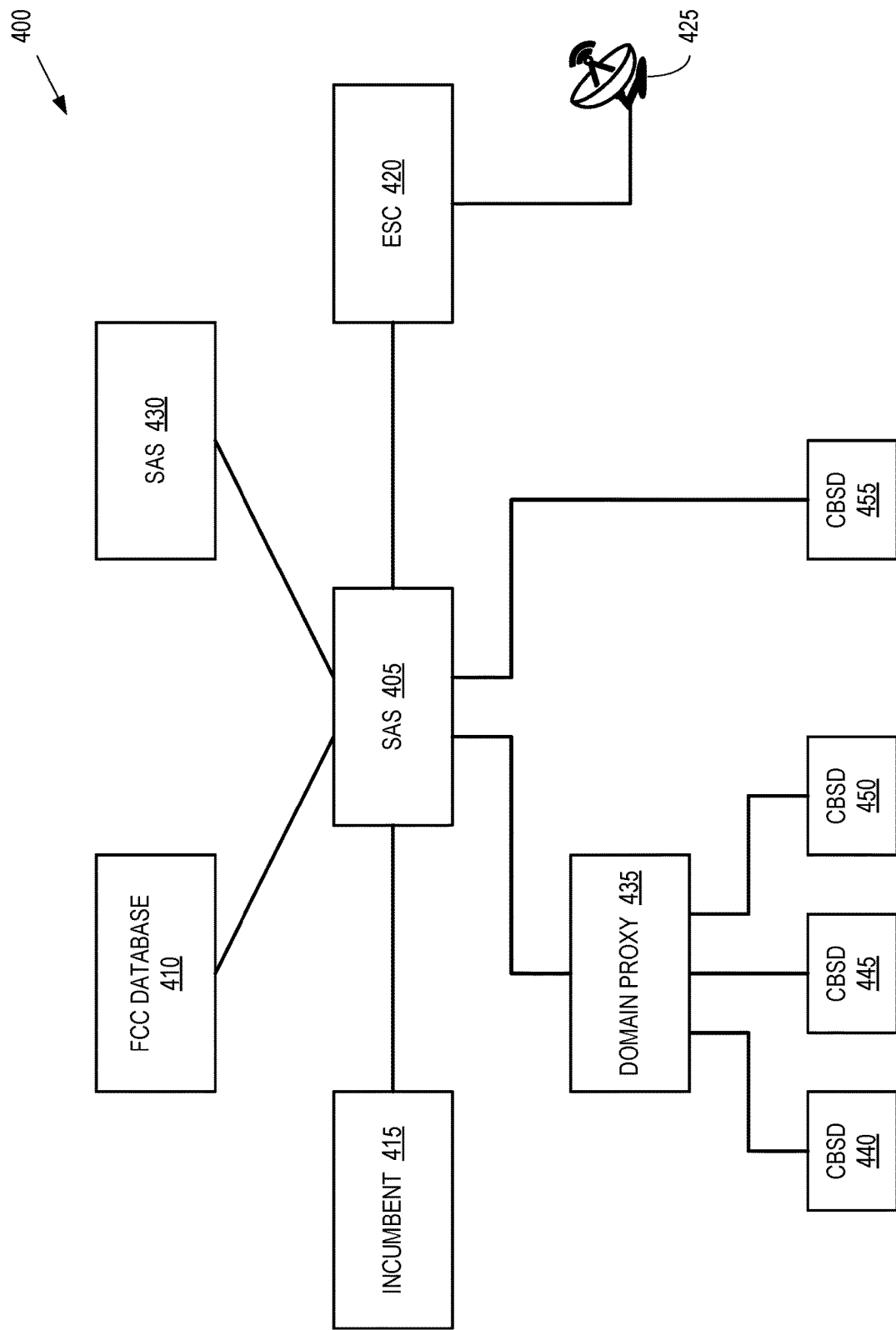
FIG. 4 is a block diagram of a communication system that implements tiered spectrum access according to some embodiments.

FIG. 4 is a block diagram of a communication system 400 that implements tiered spectrum access according to some embodiments. In the illustrated embodiment, the communication system 400 implements tiered spectrum access in the 3550-3700 CBRS band via a WInnForum architecture. The communication system 400 includes an SAS 405 that performs operations including incumbent interference determination and channel assignment, e.g., for CBRS channels shown in FIG. 3. An FCC database 410 stores a table of frequency allocations that indicate frequencies allocated to incumbent users and PAL licensees. An informing incumbent 415 provides information indicating the presence of the incumbent (e.g., a coverage area associated with the incumbent, and allocated frequency range, a time interval, and the like) to the SAS 405. The SAS 405 allocates other portions of the frequency range to provide exclusive access to the informing incumbent 415 within the coverage area. An environmental sensing capability (ESC) 420 performs incumbent detection to identify incumbents using a portion of a frequency range within the geographic area, e.g., using a radar sensing apparatus 425. Some embodiments of the SAS 405 are connected to other SAS 430 via corresponding interfaces so that the SAS 405, 430 are able to coordinate allocation of portions of the frequency range in geographic areas or time intervals.

A domain proxy 435 mediates communication between the SAS 405 and one or more CBSD 440, 445, 450 via corresponding interfaces. The domain proxy 435 receives channel access requests from the CBSDs 440, 445, 450 and verifies that the CBSDs 440, 445, 450 are permitted to request channel allocations from the SAS 405. The domain proxy 435 forwards requests from the permitted CBSDs 440, 445, 450 to the SAS 405. In some embodiments, the domain proxy 435 aggregates the requests from the permitted CBSDs 440, 445, 450 before providing the aggregated request to the SAS 405. The domain proxy 435 aggregates requests based on an aggregation function that is a combination of two parameters: (1) a maximum number of requests that can be aggregated into a single message and (2) a maximum wait duration for arrival of requests that are to be aggregated into a single message. For example, if the wait duration is set to 300 ms and the maximum number of requests is 500, the domain proxy accumulates receive requests until the wait duration reaches 300 ms or the number of accumulated requests which is 500, whichever comes first. If only a single request arrives within the 300 ms wait duration, the "aggregated" message includes a single request.

Thus, from the perspective of the SAS 405, the domain proxy 435 operates as a single entity that hides or abstracts presence of the multiple CBSDs 440, 445, 450 and conveys communications between the SAS 405 and the CBSDs 440, 445, 450. One or more CBSD 455 (only one shown in the interest of clarity) are connected directly to the SAS 405 and can therefore transmit channel access requests directly to the SAS 405. Additional discussion of this architecture is provided in Appendix B, from the Wireless Innovation Forum, entitled "Requirements for Commercial Operation in the U.S. 3550-3700 MHz Citizens Broadband Radio Service Band", Working Document WINNF-TS-0112, Version V1.4.130, Jan. 16, 2018, which is incorporated by reference herein in its entirety.

Figure 5:
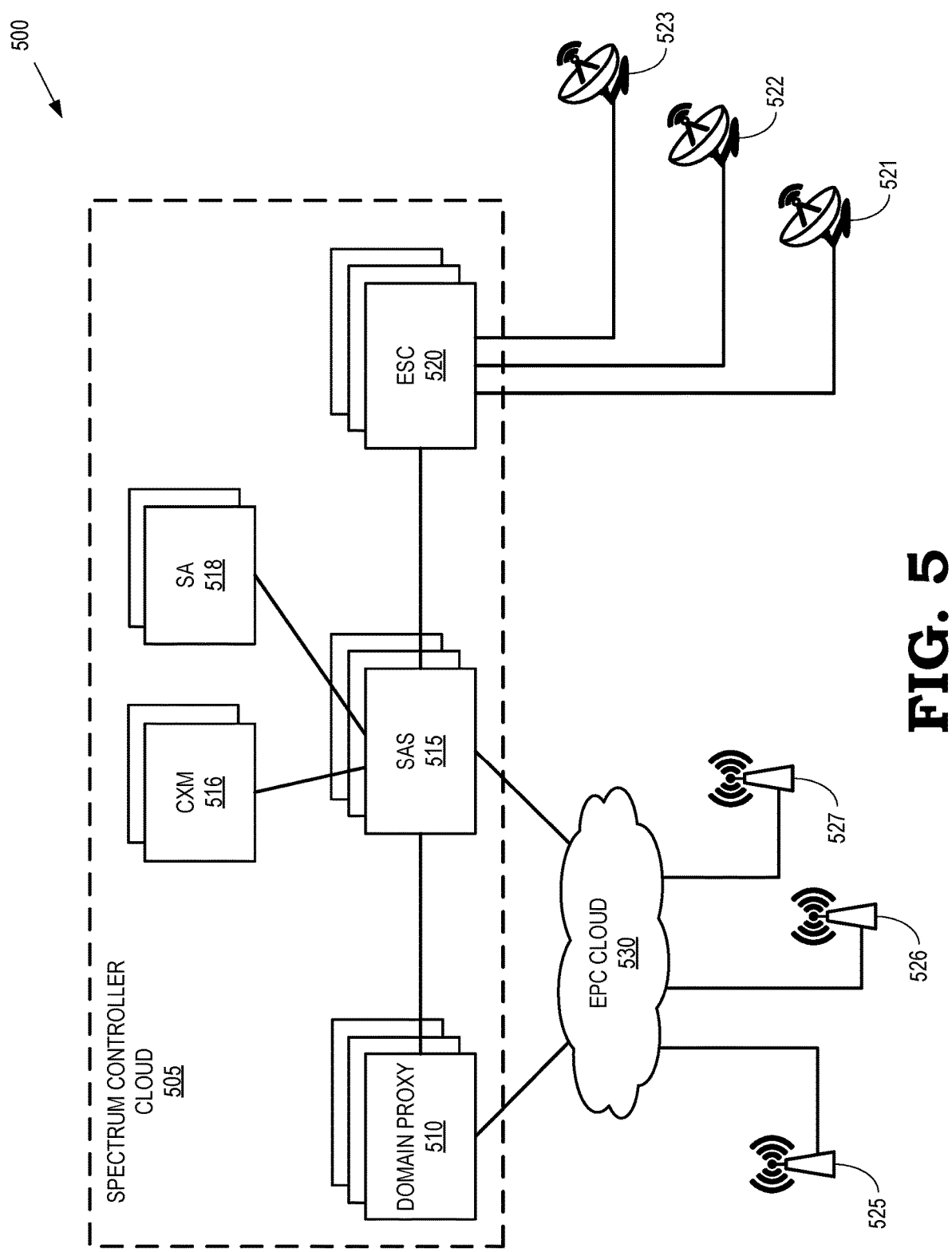
FIG. 5 is a block diagram of a communication system that implements a spectrum controller cloud to support deployment of private enterprise networks in a shared spectrum according to some embodiments.

FIG. 5 is a block diagram of a communication system 500 that implements a spectrum controller cloud 505 to support deployment of private enterprise networks in a shared spectrum according to some embodiments. The spectrum controller cloud 505 instantiates multiple instances of domain proxies 510 that support one or more private enterprise networks. The spectrum controller cloud 505 also instantiates multiple SAS instances 515 that support one or more private enterprise networks. Although not shown in FIG. 5, the SAS instances 515 can be connected to other SAS instances, e.g., in other clouds, via corresponding interfaces. Coexistence management (CXM) functions 516 and spectrum analytics (SA) functions 518 are also instantiated in the spectrum controller cloud 505.

One or more ESC instances 520 are instantiated and used to detect the presence of incumbents. In the illustrated embodiment, standalone ESC sensors 521, 522, 523 (collectively referred to herein as "the sensors 521-523") are used to monitor a frequency band to detect the presence of an incumbent such as a Navy ship. The ESC instances 520 notify the corresponding instance of the SAS 515 in response to detecting the presence of an incumbent in a corresponding geographic area. The SAS 515 is then able to instruct non-incumbent devices that serve the geographic area to vacate portions of the spectrum overlapping with the spectrum allocated to the incumbent, e.g., by defining a DPA.

One or more base stations 525, 526, 527 (collectively referred to herein as "the base stations 525-527") in a private enterprise network communicate with one or more of the domain proxies 510 and the SAS instances 515 via an evolved packet core (EPC) cloud 530. The base stations 525-527 have different operating characteristics. For example, the base station 525 operates according to a PAL in the 3.5 GHz frequency band, the base station 526 operates according to GAA in the 3.5 GHz frequency band, and the base station 525 operates according to a PAL and GAA in the 3.5 GHz frequency band. The base stations 525-527 are configured as Category A (indoor operation with a maximum power of 30 dBm) and Category B (outdoor operation with a maximum power of 47 dBm). However, in other embodiments, one or more of the base stations 525-527 are configured as either Category A or Category B. The EPC cloud 530 provides functionality including LTE EPC operation support system (OSS) functionality, analytics such as traffic analytics used to determine latencies, and the like.

Figure 6:
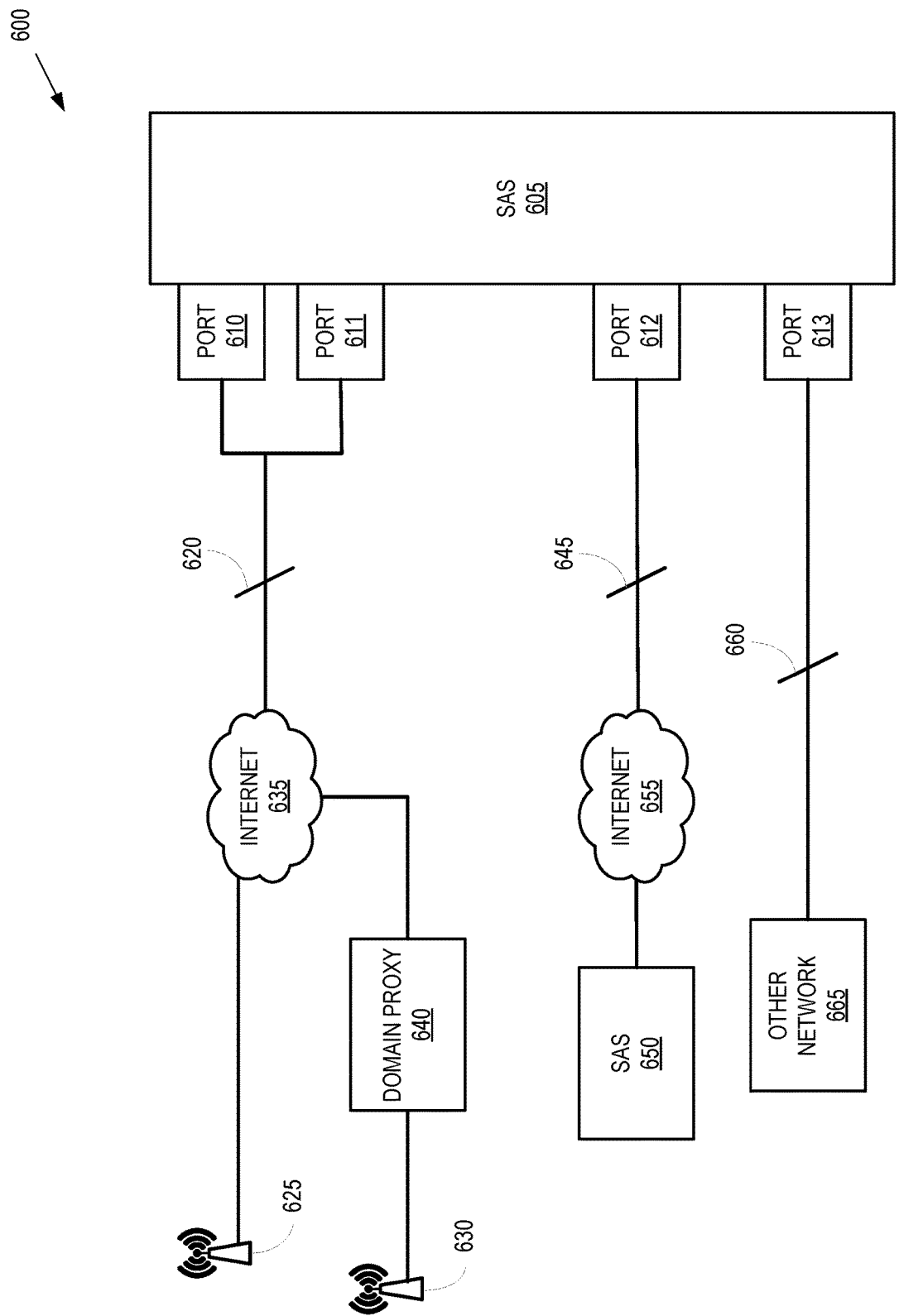
FIG. 6 is a block diagram of communication system including interfaces between CBSDs and an SAS according to some embodiments.

FIG. 6 is a block diagram of communication system 600 including interfaces between CBSDs and an SAS 605 according to some embodiments. The SAS 605 is used to implement some embodiments of the SAS 115 shown in FIG. 1, the SAS 405, 430 shown in FIG. 4, and the instances of the SAS 515 shown in FIG. 5. The SAS 605 includes ports 610, 611, 612, 613 (collectively referred to herein as "the ports 610-613") that provide access to the SAS 605.

An interface 620 supports communication between the SAS 605 and CBSDs 625, 630 via a network such as the Internet 635 and the ports 610, 611. The CBSD 625 is connected directly to the SAS 605 via the interface 620. The CBSD 630 is connected to the SAS 605 via a domain proxy 640 that is connected to the SAS 605 by the interface 620. The domain proxy 640 corresponds to some embodiments of the domain proxy 130 shown in FIG. 1, the domain proxy 435 shown in FIG. 4, and the instances of the domain proxy 510 shown in FIG. 5. An interface 645 supports communication between the SAS 605 and one or more other SAS 650 (only one shown in FIG. 6 in the interest of clarity) via a network such as the Internet 655 and the port 612. The SAS 650 can be owned and operated by other providers. An interface 660 supports communication between the SAS 605 and one or more other networks 665 (only one shown in FIG. 6 in the interest of clarity) via the port 613.

Figure 7:
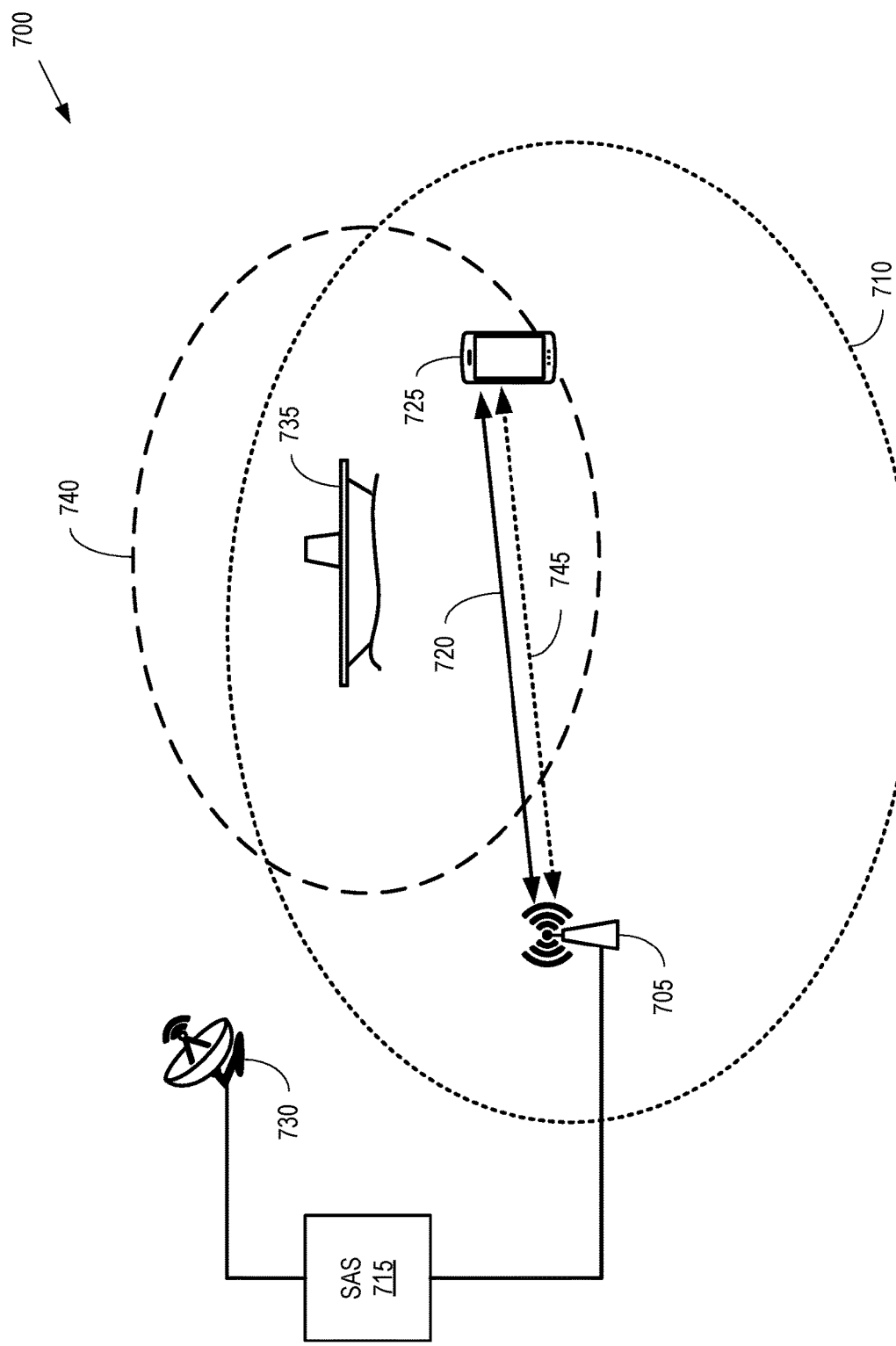
FIG. 7 is a block diagram of a communication system that implements redundant allocation of portions of a frequency band to an operator according to some embodiments.

FIG. 7 is a block diagram of a communication system 700 that implements redundant allocation of portions of a frequency band to an operator according to some embodiments. The communication system 700 corresponds to some embodiments of the communication system 100 shown in FIG. 1, the communication system 400 shown in FIG. 4, and the communication system 500 shown in FIG. 5, although some elements of the communication systems 100, 400, 500 are omitted from FIG. 7 in the interest of clarity.

In the illustrated embodiment, an operator uses one or more base stations 705 (only one shown in FIG. 7 in the interest of clarity) to provide wireless connectivity within a geographic area 710. The base station 705 transmits an access request to an SAS 715 to request a grant of access to a portion of a frequency band, as discussed herein. In response to receiving the request, the SAS 715 allocates a first portion and a second portion of the frequency band to the operator of the base station 705 to provide redundant access channels. Some embodiments of the SAS 715 (or an associated domain proxy) include a coexistence manager that allocates the first portion and the second portion as far apart as possible in frequency. The base station 705 uses the redundant access channels in the first portion and the second portion to reduce or eliminate a likelihood that the presence of an incumbent will interrupt service provided by the base station 705 because of the requirement that the base station 705 vacate any portions of the frequency band that overlap with another (third) portion of the frequency band that is allocated to an incumbent that arrives in the geographic area 710. The first portion and the second portion are separated in frequency by a frequency difference that is larger than a threshold value associated with incumbents. For example, the frequency difference is larger than a threshold value of 20 MHz if incumbents are allocated portions of the frequency band that are less than a maximum bandwidth of 20 MHz.

The base station 705 establishes a wireless connection 720 with one or more user equipment 725 (only one shown in FIG. 7 in the interest of clarity) in the first portion of the frequency band. The base station uses the wireless connection 720 to communicate with the user equipment 725 as long as no incumbents are detected within the geographic area 710.

An ESC device 730 monitors a region including the geographic area 710. For example, the ESC device 730 can use a radar system to monitor frequencies within the frequency band to detect the presence of incumbents. In the illustrated embodiment, the ESC device 730 detects the presence of an incumbent 735 in the geographic area 710. The ESC device 730 determines that the incumbent 735 is allocated exclusive use of a third portion of the frequency band. The ESC device 730 therefore notifies the SAS 715 of the presence of the incumbent 735. In response to receiving the notification from the ESC device 730, the SAS 715 activates a dynamic protection area (DPA) 740 that overlaps with the geographic area 710. The SAS 715 therefore instructs the base station 705 to vacate any portions of the frequency band that overlap with the third portion that is reserved for exclusive use by the incumbent 735.

In the illustrated embodiment, the first portion of the frequency band used to establish the wireless connection 720 overlaps with the third portion of the frequency band reserved for exclusive use of the incumbent 735. However, the second portion of the frequency band does not overlap with the third portion because the second portion is separated from the first portion by a frequency difference that is larger than a bandwidth of the third portion. The base station 705 therefore hands over the user equipment 725 to a wireless connection 745 that is established in the second portion of the frequency band. In response to handing over the user equipment 725, the base station 705 vacates the first portion of the frequency band, e.g., by reducing transmission power in the first portion so that the reduced size of the geographic area 710 does not overlap with the DPA 740 or by interrupting transmission in the first portion. The base station 705 is therefore able to provide uninterrupted, high-availability service to the user equipment 725.

The operator has one or more PAL in some embodiments. For example, the operator can be a PAL licensee for one channel, in which case the operator transmits a request for one PAL channel and one GAA channel. The PAL channel is used to establish the wireless connection 720 in the first portion. The GAA channel is used for the redundant channel in the second portion that is used to establish the wireless connection 745 in response to arrival of the incumbent 735. For another example, the operator can be a PAL licensee for two channels, in which case the operator transmits requests for two PAL channels to support the wireless connections 720, 745 in the first and second portions, respectively. A coexistence manager in the SAS 715 maintains a frequency separation of the PAL channel assignments, e.g., the channels that are granted access according to the PALs are assigned to first and second portions of the frequency band that are separated by a frequency difference larger than the threshold.

Figure 8:
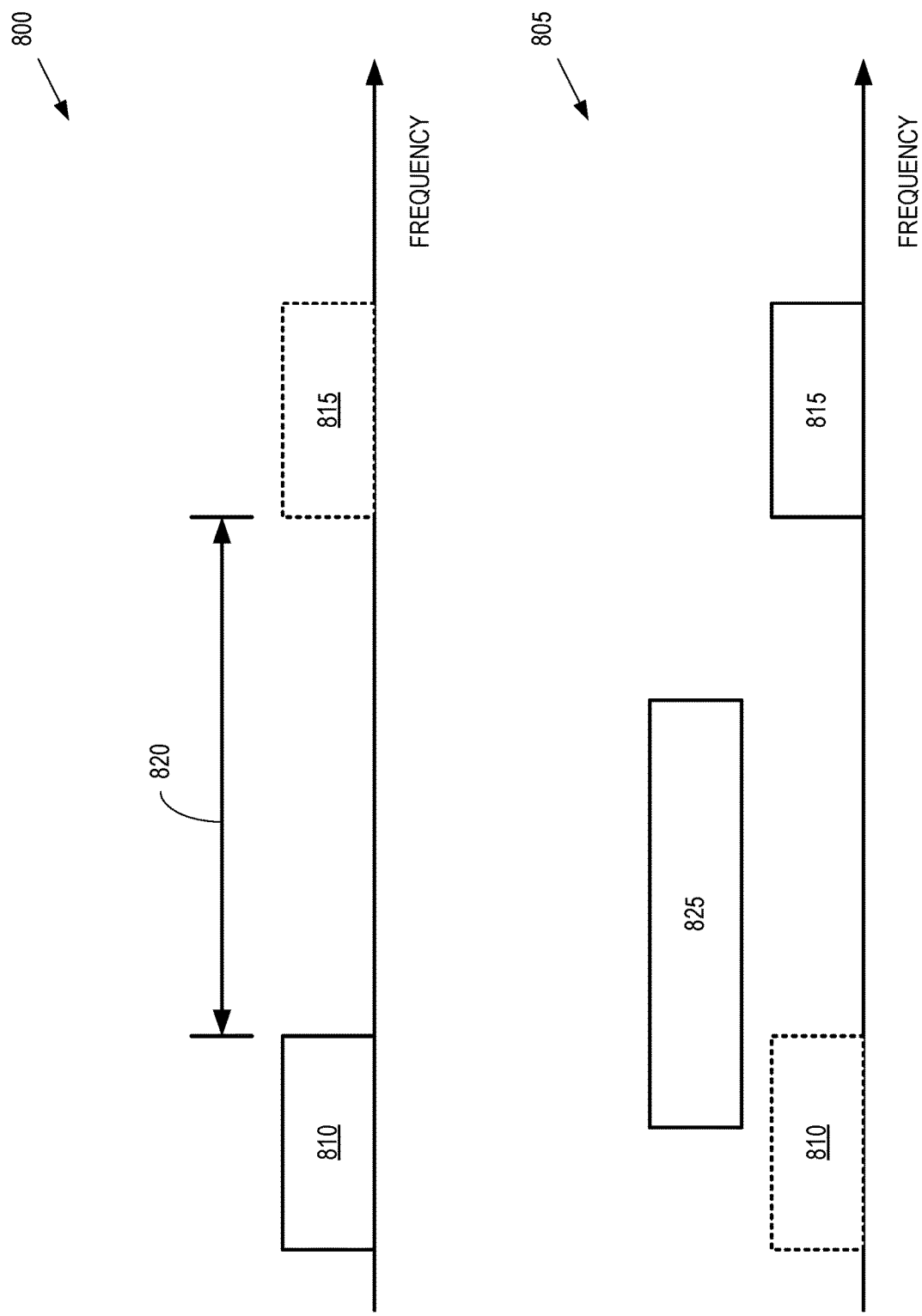
FIG. 8 illustrates allocations of redundant portions of a frequency band to an operator to avoid interruptions due to arrival of an incumbent according to some embodiments.

FIG. 8 illustrates allocations 800, 805 of redundant portions of a frequency band to an operator to avoid interruptions due to arrival of an incumbent according to some embodiments. The allocations of 800, 805 are selected by an SAS such as the SAS 115 shown in FIG. 1, the SAS 405, 430 shown in FIG. 4, the instances of the SAS 515 shown in FIG. 5, the SAS 605, 650 shown in FIG. 6, and the SAS 715 shown in FIG. 7.

The allocation 800 illustrates a first portion 810 and a second portion 815 of a frequency bands that are allocated to an operator (and one or more corresponding base stations) for providing wireless connectivity. In some embodiments, the first portion 810 or the second portion 815 (or both) operate according to a PAL. The first portion 810 is separated from the second portion 815 by a frequency difference 820 that is larger than a threshold determined based on a maximum bandwidth of portions of the frequency band that are allocated to incumbents. A base station uses the first portion 810 to establish wireless connectivity with user equipment in a geographic area. The second portion 815 is not being used to establish wireless connectivity, as indicated by the dotted line box.

The allocation 805 illustrates the first portion 810, the second portion 815, and a third portion 825 that is allocated to an incumbent. In the illustrated embodiment, the incumbent is present in the geographic area that is initially being served by the base station using the first portion 810. The third portion 825 overlaps with the first portion 810. The base station is therefore required to vacate the first portion 810. In response to detecting arrival of the incumbent, the base station hands off user equipment that are receiving wireless connectivity using the first portion 810 to channels in the second portion 815. The base station then vacates the first portion 810, as indicated by the dotted line box. The second portion 815 does not overlap with the third portion 825 due to the frequency difference 820 between the first portion 810 and the second portion 815. Thus, the operator is able to provide uninterrupted, high-availability wireless connectivity in the presence of an incumbent that has exclusive use of a portion of the frequency band.

Figure 9:
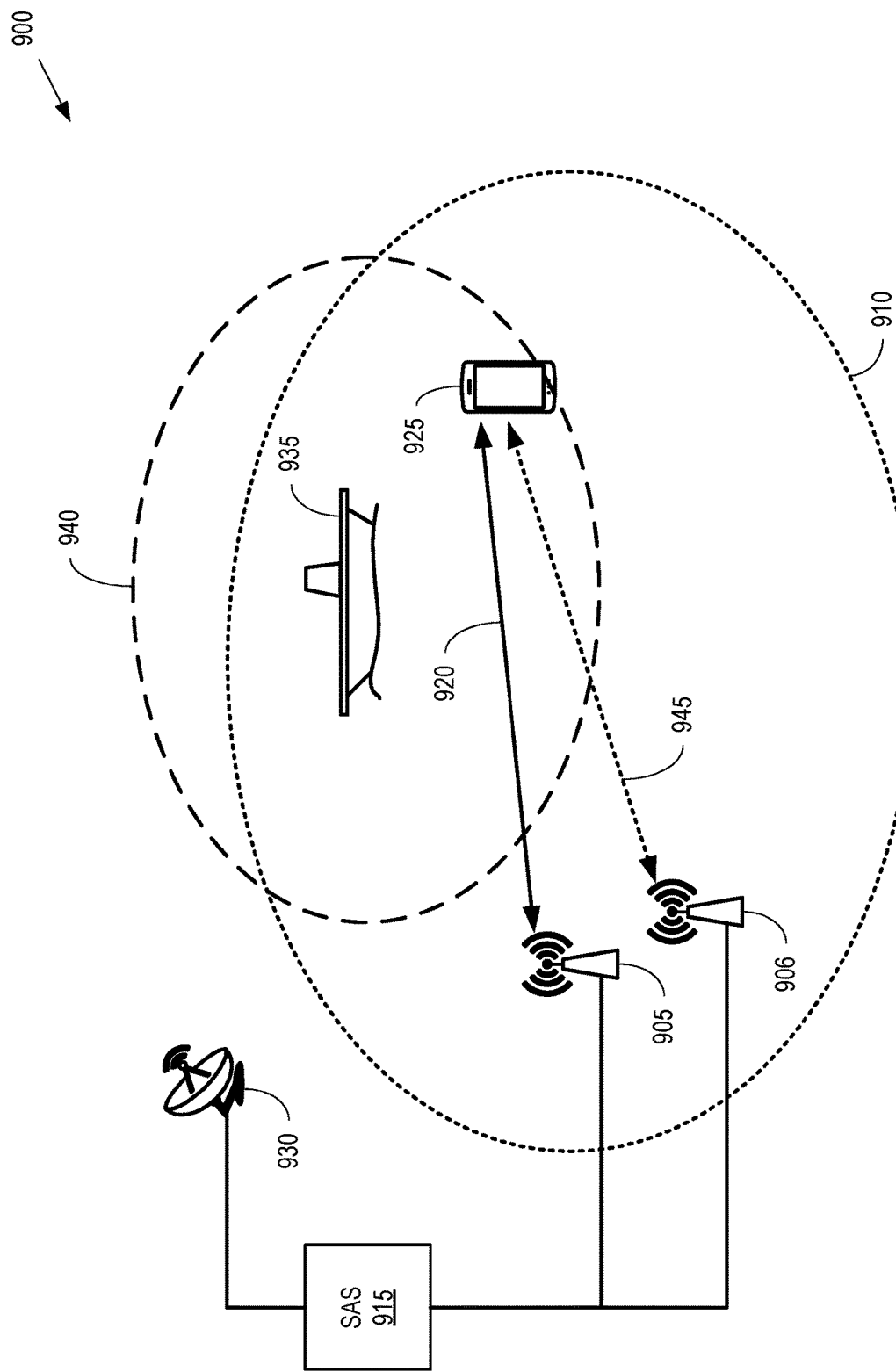
FIG. 9 is a block diagram of a communication system that implements redundant allocation of portions of a frequency band to an operator according to some embodiments.

FIG. 9 is a block diagram of a communication system 900 that implements redundant allocation of portions of a frequency band to an operator according to some embodiments. The communication system 900 corresponds to some embodiments of the communication system 100 shown in FIG. 1, the communication system 400 shown in FIG. 4, and the communication system 500 shown in FIG. 5, although some elements of the communication systems 100, 400, 500 are omitted from FIG. 9 in the interest of clarity.

In the illustrated embodiment, an operator uses collocated base stations 905, 906 to provide wireless connectivity within a geographic area 910. The base station 905 transmits an access request to an SAS 915 to request a grant of access to a portion of a frequency band, as discussed herein. In response to receiving the request, the SAS 915 allocates a first portion of the frequency band to the base station 905 and a second portion of the frequency band to the base station 906 to provide redundant access channels. Some embodiments of the SAS 915 (or an associated domain proxy) include a coexistence manager that allocates the first portion and the second portion as far apart as possible in frequency. The first portion and the second portion are separated in frequency by a frequency difference that is larger than a threshold value associated with incumbents. For example, the frequency difference is larger than a threshold value of 20 MHz if incumbents are allocated portions of the frequency band that are less than a maximum bandwidth of 20 MHz.

The base station 905 establishes a wireless connection 920 with one or more user equipment 925 (only one shown in FIG. 9 in the interest of clarity) in the first portion of the frequency band. The base station uses the wireless connection 920 to communicate with the user equipment 925 as long as no incumbents are detected within the geographic area 910. An ESC device 930 monitors a region including the geographic area 910. In response to receiving a notification of the presence of an incumbent 935 from the ESC device 730, the SAS 915 activates a dynamic protection area (DPA) 940 that overlaps with the geographic area 910. The SAS 915 therefore instructs the base station 905 to vacate any portions of the frequency band that overlap with the third portion that is reserved for exclusive use by the incumbent 935.

In the illustrated embodiment, the first portion of the frequency band used to establish the wireless connection 920 overlaps with the third portion of the frequency band reserved for exclusive use of the incumbent 935. However, the second portion of the frequency band does not overlap with the third portion because the second portion is separated from the first portion by a frequency difference that is larger than a bandwidth of the third portion. The base station 905 therefore hands over the user equipment 925 to the collocated base station 906, which establishes a wireless connection 945 with the user equipment 925 in the second portion of the frequency band. In response to handing over the user equipment 925, the base station 905 vacates the first portion of the frequency band, e.g., by reducing transmission power in the first portion so that the reduced size of the geographic area 910 does not overlap with the DPA 940 or by interrupting transmission in the first portion. The collocated base stations 905, 906 are therefore able to provide uninterrupted, high-availability service to the user equipment 925.

Some embodiments of the collocated base stations 905, 906 are each able to support multiple channels in different portions of the frequency band. For example, the base station 905 can support two channels in two different portions of the frequency band and the base station 910 can support two channels into different portions of the frequency band. The portions are allocated to the base stations 905, 906 provide frequency and hardware redundancy. For example, the first and second portions (separated by a frequency difference greater than the threshold) are allocated to the base stations 905, 906, respectively. Third and fourth portions (separated by a frequency difference greater than the threshold) are also allocated to the base stations 905, 906, respectively. The user equipment 925 can therefore be handed off between different combinations of the base stations 905, 906 and the first, second, third, and fourth portions of the frequency band.

The SAS 915 (or an associated domain proxy) distributes available PAL to the collocated base stations 905, 906. Some embodiments of the SAS 915 (or associated domain proxy) ensure that access requests from the base stations 905, 906 include information identifying different PAL so that the different PAL are used to provide access in the different allocated portions of the frequency band. For example, first and second PAL can be used for the first and second portions of the frequency band allocated to the base stations 905, 906, respectively. If only a single PAL is available, the SAS 915 (or associated domain proxy) ensures that the collocated base stations 905, 906 request one PAL channel and one GAA channel.

FIG. 10 illustrates channel allocations and corresponding licenses assigned to collocated base stations 905, 906 shown in FIG. 9 according to some embodiments. In the illustrated embodiment, the frequency band is partitioned to include 70 MHz for PAL licensees followed by 80 MHz for GAA users. The collocated base stations 905, 906 each support two channels. In response to a channel access request, the SAS 915 shown in FIG. 9 allocates portions of the frequency band to the various channels based on a threshold corresponding to a maximum bandwidth of a portion of the frequency band allocated to an incumbent. For example, channel 1 of the base station 905 is allocated a portion from 3550 MHz to 3570 MHz and channel 2 of the base station 905 is allocated a portion from 3640 MHz to 3660 MHz. Channel 1 of the base station 906 is allocated a portion from 3600 MHz to 3620 MHz and channel 2 of the base station 906 is allocated a portion from 3680 MHz to 3700 MHz. Channel 1 of both the collocated base stations 905, 906 operate according to a PAL and channel 2 of both the collocated base stations 905, 906 operate according to GAA. The base stations 905, 906 therefore provide wireless connectivity on redundant channels. For example, the base station 905 can establish wireless connectivity using channel 1 and then handoff to channel 1 of the base station 906 in response to arrival of an incumbent that has exclusive used to a portion of the frequency band that overlaps with the 3550-3570 MHz band.

Figure 11:
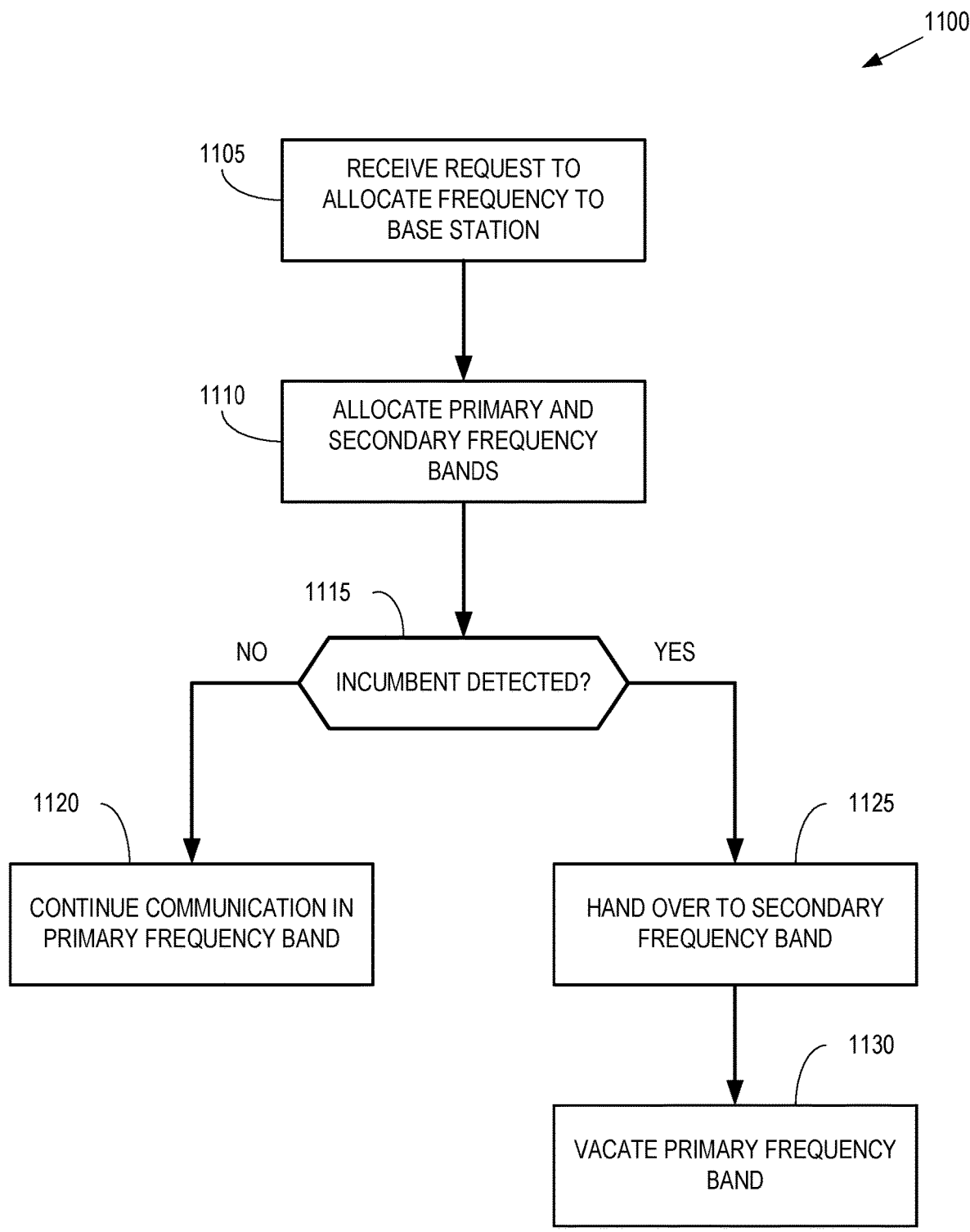
FIG. 11 is a flow diagram of a method of handing over user equipment to a redundant portion of a frequency band in response to arrival of an incumbent according to some embodiments.

FIG. 11 is a flow diagram of a method 1100 of handing over user equipment to a redundant portion of a frequency band in response to arrival of an incumbent according to some embodiments. The method 1100 is implemented in some embodiments of the communication system 100 shown in FIG. 1, the communication system 400 shown in FIG. 4, the communication system 500 shown in FIG. 5, the communication system 700 shown in FIG. 7, and the communication system 900 shown in FIG. 9.

At block 1105, an SAS receives a request to allocate portions of the frequency band to one or more base stations. Some embodiments of the request include information indicating a coverage area of the base station, a preferred frequency, a preferred bandwidth, a time interval for usage of the allocated frequency, and the like.

At block 1110, the SAS allocates primary and secondary frequency bands to the one or more base stations. The SAS selects the primary and secondary frequency bands so that they are separated by at least a threshold that corresponds to a maximum bandwidth of frequencies allocated to an incumbent for exclusive use, as discussed herein. The primary and secondary frequency bands are used to support two channels in a single base station or channels in different, but collocated, base stations, as discussed herein. Wireless connections with user equipment are established in the primary frequency band.

At decision block 1115, the SAS determines whether an incumbent has been detected in a region that overlaps with the geographic area served by the one or more base stations in the primary frequency band. In some embodiments, the SAS makes the determination based on signals received from an ESC that is monitoring the geographic area for the presence of incumbents. If no incumbent is detected, the method 1100 flows to block 1120 and communication in the primary frequency band continues. If an incumbent is detected, the method 1100 flows to block 1125.

At block 1125, the user equipment are handed over to the secondary frequency band. As discussed herein, handover of the user equipment includes handover between channels maintained by the same the base station or handover between channels maintained by different, collocated base stations. At block 1130, the primary frequency band is vacated, e.g., by reducing a transmission power in the primary frequency band or by interrupting transmission in the primary frequency band.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
  establishing, at a first base station, a wireless connection in a first portion of a frequency band with a user equipment located in a first geographic area, wherein the first portion is allocated to an operator of the first base station in response to a request transmitted to a spectrum access server (SAS); and
  handing over the user equipment from the first portion to a second portion of the frequency band in response to detecting presence of an incumbent that is allocated a third portion of the frequency band for use within a second geographic area that overlaps with the first geographic area, wherein the third portion overlaps with the first portion, and wherein the second portion is allocated to the operator in response to the request transmitted to the SAS.

2. The method of claim 1, further comprising:
  transmitting the request from the first base station to the SAS; and
  receiving information allocating the first portion and the second portion of the frequency band in response to transmitting the request.

3. The method of claim 1, wherein the first base station provides wireless connectivity in the first portion and the second portion of the frequency band.

4. The method of claim 3, wherein the operator is granted a priority access license (PAL) in the first portion of the frequency band, and wherein the operator is a general authorized access (GAA) operator in the second portion of the frequency band.

5. The method of claim 1, wherein the first base station is collocated with a second base station that provides wireless connectivity in the second portion of the frequency band, and wherein handing over the wireless connection from the first portion to the second portion comprises handing over the wireless connection from the first base station to the second base station.

6. The method of claim 5, wherein the first base station provides wireless connectivity in a fourth portion of the frequency band that is allocated to the operator in response to the request transmitted to the SAS, and wherein the second base station provides wireless connectivity in a fifth portion of the frequency band is allocated to the operator in response to the request transmitted to the SAS.

7. The method of claim 1, further comprising:
  interrupting the wireless connection in the first portion of the frequency band in response to handing over the user equipment to the second portion of the frequency band.

8. The method of claim 1, further comprising:
  reducing transmission power of the first base station in the first portion of the frequency band in response to handing over the user equipment to the second portion of the frequency band.

9. A first base station comprising:
  a transceiver configured to establish a wireless connection in a first portion of a frequency band with a user equipment located in a first geographic area, wherein the first portion is allocated to an operator of the first base station in response to a request transmitted to a spectrum access server (SAS); and
  a processor configured to handover the user equipment from the first portion to a second portion of the frequency band in response to detecting presence of an incumbent that is allocated a third portion of the frequency band for use within a second geographic area that overlaps with the first geographic area, wherein the third portion overlaps with the first portion, and wherein the second portion is allocated to the operator in response to the request transmitted to the SAS.

10. The first base station of claim 9, wherein the transceiver is configured to:
  transmit the request from the first base station to the SAS; and
  receive information allocating the first portion and the second portion of the frequency band in response to transmitting the request.

11. The first base station of claim 9, wherein the transceiver provides wireless connectivity in the first portion and the second portion of the frequency band.

12. The first base station of claim 11, wherein the operator is granted a priority access license (PAL) in the first portion of the frequency band, and wherein the operator is a general authorized access (GAA) operator in the second portion of the frequency band.

13. The first base station of claim 9, wherein the first base station is collocated with a second base station that provides wireless connectivity in the second portion of the frequency band, and wherein the processor hands over the wireless connection from the first base station to the second base station.

14. The first base station of claim 13, wherein the transceiver provides wireless connectivity in a fourth portion of the frequency band that is allocated to the operator in response to the request transmitted to the SAS, and wherein the second base station provides wireless connectivity in a fifth portion of the frequency band is allocated to the operator in response to the request transmitted to the SAS.

15. The first base station of claim 9, wherein the transceiver is configured to interrupt the wireless connection in the first portion of the frequency band in response to handing over the user equipment to the second portion of the frequency band.

16. The first base station of claim 9, wherein the transceiver is configured to reduce a transmission power in the first portion of the frequency band in response to handing over the user equipment to the second portion of the frequency band.

17. A method, comprising:
  allocating, at a spectrum access server (SAS), a first portion and a second portion of a frequency band to an operator in response to receiving a request from a base station to allocate resources for wireless connectivity within a geographic area, wherein the first portion and the second portion are separated by a frequency bandwidth that is larger than a threshold determined based on a frequency bandwidth allocated to incumbents; and
  activating, at the SAS subsequent to allocating the first and second portions, a dynamic protection area (DPA) in response to detecting an incumbent that is allocated a third portion of the frequency band for use within the DPA, wherein the base station is required to vacate the first portion in response to the first portion overlapping the third portion and the geographic area overlapping the DPA.

18. The method of claim 17, wherein allocating the first portion and the second portion of the frequency band comprises granting the operator a priority access license (PAL) in the first portion of the frequency band.

19. The method of claim 17, further comprising:
  allocating, at the SAS, a fourth portion and a fifth portion of the frequency band to the operator in response to receiving the request, and wherein the fourth and fifth portions of the frequency band are separated by a frequency bandwidth that is larger than the threshold.

20. The method of claim 19, further comprising:
  granting a plurality of priority access licenses (PALs) to the operator for different portions of the frequency band, wherein the plurality of PALs is distributed among a plurality of base stations operated by the operator.

* * * * *